COMPUTING ELEMENTS AND SYSTEMS

Filed April 22, 1954 2 Sheets-Sheet 1

| BINARY | DECIMAL |
|---|---|
| X Y | |
| 0 0 | 0 |
| 0 1 | 1 |
| 1 0 | 2 |
| 1 1 | 3 |

INVENTOR
HOWARD E. TOMPKINS
BY
Laurence R. Brown
ATTORNEY

Aug. 6, 1957 H. E. TOMPKINS 2,802,138
COMPUTING ELEMENTS AND SYSTEMS
Filed April 22, 1954 2 Sheets-Sheet 2

| BINARY $X_1$ $Y_1$ $X_2$ $Y_2$ | DECIMAL | TARGET |
|---|---|---|
| 0 0 0 0 | 0 | 44 |
| 0 0 0 1 | 1 | 43 |
| 0 0 1 0 | 2 | 41 |
| 0 0 1 1 | 3 | 42 |
| 0 1 0 0 | 4 | 34 |
| 0 1 0 1 | 5 | 33 |
| 0 1 1 0 | 6 | 31 |
| 0 1 1 1 | 7 | 32 |
| 1 0 0 0 | 8 | 14 |
| 1 0 0 1 | 9 | 13 |
| 1 0 1 0 | 10 | 11 |
| 1 0 1 1 | 11 | 12 |
| 1 1 0 0 | 12 | 24 |
| 1 1 0 1 | 13 | 23 |
| 1 1 1 0 | 14 | 21 |
| 1 1 1 1 | 15 | 22 |

| $X_1$ | $Y_1$ | $X_2$ | $Y_2$ | TARGET |
|---|---|---|---|---|
| 0 | 0 | 0 | 0 | 44 |
| 0 | 0 | 1 | 0 | 41 |
| 0 | 1 | 0 | 0 | 34 |
| 0 | 1 | 1 | 0 | 31 |
| 1 | 0 | 0 | 0 | 14 |
| 1 | 0 | 1 | 0 | 11 |
| 1 | 1 | 0 | 0 | 24 |
| 1 | 1 | 1 | 0 | 21 |

INVENTOR
HOWARD E. TOMPKINS
BY
Laurence R. Brown
ATTORNEY

United States Patent Office 2,802,138

Patented Aug. 6, 1957

2,802,138

COMPUTING ELEMENTS AND SYSTEMS

Howard E. Tompkins, Ridley Park, Pa., assignor to Burroughs Corporation, Detroit, Mich., a corporation of Michigan Application April 22, 1954, Serial No. 424,881

25 Claims. (Cl. 315—8.5)

This invention relates to electronic computer systems and elements. More particularly it relates to systems for translating electronic command signals into prescribed forms or for converting signals from one code system to another and circuit elements adapted for use in such electronic systems to store electronic energy representative of intelligible information and to function as logical concept elements in the translation of command signals into prescribed forms.

In electronic computing or calculating equipment the binary code system has been convenient in performing different computational steps because only two stable conditions "1" and "0" may be readily represented by "on" or "off" conditions of electronic devices. After performance of the computation it is generally desirable to convert the results into the more familiar decimal system. In other instances calculation steps may be more conveniently performed in other code systems and a code conversion step is desirable.

Frequently in code conversion operations storage of coded information is desired by holding one code group in a suitable register for decoding or reading at some later time. In some cases it is difficult to obtain the required signal storage time with simple devices. Any interruptions of power circuits or dynamic storage members by failures or superimposed noise conditions may further cause erratic storage indications leading to miscalculations. Accordingly a statically maintained storage device would preclude the necessity of reading out information when most noise disturbances are present during hynamic operation and therefore would afford simplified stable and accurate storage operation over a large range of circuit conditions.

Destruction of stored information in memory or storage device operation during the reading or interrogation operation is undesirable since re-reading or other use of sub-calculated conditions may be required after read out. Therefore, static storage members are desired which retain their static condition until dynamically reactuated into a different static storage state. Thus, a memory device having dynamic writing and reading states and an accompanying static storage characteristic undisturbed by the reading operation will afford a large range of utility in calculating devices, or the like.

It is, therefore, an object of the invention to provide improved electronic calculating systems and elements to perform those desired functions heretofore set forth.

It is a more particular object of the invention to provide simplified code conversion means.

A further object of the invention is to provide an improved memory device adapted for utility in electronic computer circuits.

It is still another object of the invention to provide code conversion apparatus capable of high speed operation with a large number of digits at the same time.

A still further object of the invention is to provide means for statically storing electronic signals, and for dynamically reading the stored signal condition without altering the statically stored state.

Apparatus embodying the invention to accomplish these objects comprises a cathode ray tube memory device of the general type found described in the United States Patent No. 2,698,399 to L. W. Orr and E. A. Sands for Electron Discharge Apparatus, filed July 11, 1951. In the present invention a memory tube is constructed with a cathode ray beam generating gun and a plurality of target zones arranged in a two dimensional array. A magnetic deflection yoke is utilized having a plurality of salient poles with accompanying memory element members constructed of a suitable permanent magnetic material. An associated plurality of electromagnetic windings are provided for permanently magnetizing the salient pole members in either of two polarities representing binary coded information. The pole members thus provide bi-stable magnetic storage means which direct the beam to corresponding target zones after dynamically entered command signals magnetize the memory elements, by means of the polarized magnetic field retained thereby in a static condition.

Target zones may be selected in accordance with the invention for intercepting the impinging beam at positions corresponding to polarities of the pole members as represented by a code system other than binary, if desired. Accordingly, dynamic signals may be used to energize deflection windings and thereby magnetically saturate or permanently magnetize the pole members which then remain in a static condition for reading out the code signal in a different code system by keying the beam and noting the position to which the beam is deflected.

Other features and objects of the present invention will be made apparent from the following more detailed description of the invention particularly when considered in connection with the accompanying drawing, in which.

Block diagrams are used when convenient to illustrate circuitry which is well known in the art, where the constructional details are not part of the present invention, in order to more readily illustrate the nature of the invention.

Figures 1, 2, 3:
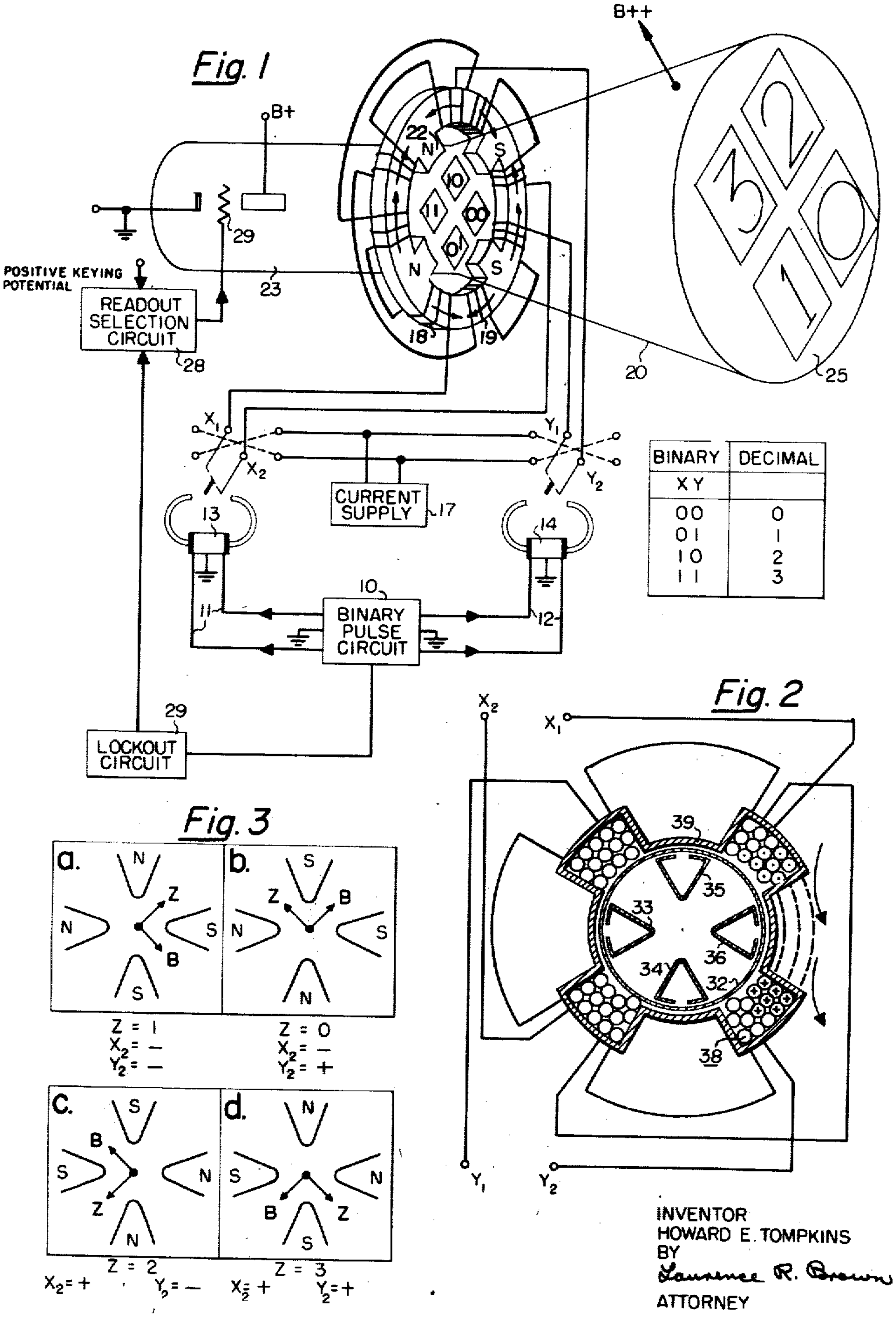
Fig. 1 is a schematic circuit and block diagram of a code conversion system embodying the invention.
Fig. 2 is a sectional view of magnetic deflection means constructed in accordance with the invention.
Fig. 3 is a diagrammatic representation of various operating conditions peculiar to the cathode ray memory device disclosed in connection with the invention.

Consider now the computer system of Fig. 1 which illustrates the operational features utilized in accordance with one phase of the invention to translate or convert electronic command signals from one coding system to another. For purposes of simplicity in explanation of various features of the invention the circuit is constructed to convert from a two digit binary code to one digit decimal numbers, although those concepts taught hereinafter will enable those skilled in the art to readily extend the operation of such circuits to many digits or other coding systems without departing from the spirit and the scope of the present invention.

Binary coded signals are derived from any suitable electronic circuit 10. In this embodiment electrical pulses are provided at one of each pair of output leads 11, 12 to actuate respectively the three position relays 13, 14 from their normally centered position to one of the respective contact positions labelled "1" and "0" to correspond to binary code input pulses obtained from the similarly labelled output leads of the circuit 10. The relays 13, 14 function respectively to connect current from the direct current supply circuit 17 to the windings 18, 19 for deflecting a cathode ray beam in tube 20 respectively along the "X" and "Y" axes. Thus there is provided means for selectively magnetically exciting the different deflection windings in one or the other of two polarities.

The deflection yoke comprises salient pole members 22 positioned about the cathode ray beam path along the neck 23 of the tube 20. These members are preferably constructed in part of a permanent magnetic material having high magnetic flux retentivity so that current flow in the respective windings 18, 19 will magnetize the corresponding pairs of poles enough to deflect the beam to the indicated targets on the screen 25 of the cathode ray tube 20 when the relays 13, 14 have returned to their center positions and the deflection circuits are in a quiescent magnetic state. The length of the pulses required to saturate the permanent magnet elements may be selected by those skilled in the art to conform with the parameters of the windings, yoke materials and available current. Maximum computing speeds depend upon these parameters and therefore a short pulse length is preferred in high speed computation systems.

A high degree of accuracy may be maintained as long as a saturating magnetic flux is provided by the command circuits of the tube, since the hysteresis characteristics of the pole members remain constant. In addition, a memory cycle is provided which may be maintained until a further dynamic deflection command signal is received, thereby changing the magnetic polarity of the salient pole pairs.

Readout of the stored code signal is provided by keying on the cathode ray beam and determining the position to which the beam is deflected. In Fig. 1 the tube 20 may be, for example, a conventional cathode ray tube having a mask for distinguishing certain zones of beam deflection. The four deflection sectors available with a four-pole yoke of the type described are labelled in decimal numbers. Circuit polarities and accompanying winding configurations are shown for converting the two digit binary code provided by circuit 10 to the decimal numbers indicated in respective target areas of the screen. Other coding arrangements may be selected either by changing polarities of currents or winding directions, if desired.

A quiescent state is preferred for readout of the coded information from the magnetic deflection means. Such a state is provided preferably by the permanent magnet elements but may also be attained by establishing constant current conditions in conventional quadruple windings by the coded command signals. Keying is accomplished by a readout selection circuit 28 which connects a positive keying potential to the cathode ray tube control electrode 29 in response to a predetermined condition such as the closing of a switch contact. The beam does not disturb the permanent magnetism of the members and therefore affords readout without destruction of the memory. To assure a readout condition only when a quiescent magnetic deflection state is reached, thereby precluding any chance for computational errors or mis-readings, the lockout circuit 29 is provided. This may comprise a relay or other device responsive to output signals of the binary circuit 10 to prevent keying of the electrode 29 as long as command signals are being given.

It is therefore seen that there is provided by the invention an improved electronic code conversion system and associated computer elements for digital storage at the command of electrical pulses.

Increased circuit efficiency and higher computer speed may be realized by the device shown in Fig. 2 comprising the cathode ray tube 32 and associated deflection means. Permanent magnet material is formed into salient pole members inside the tube 32 and thereby closer to the beam so that maximum deflectional force may be exerted by the retained magnetic flux. The deflection elements comprise thin sectorial shaped salient pole members 33 to 36 arranged in four (or more) deflection sectors. Each pole member is located at the window position of its accompanying saturating winding in the combined yoke 38 located externally to the tube 32. About the yoke is an external yoke core 39 of a material having a much lower residual magnetic flux retentivity than the pole members. The flux efficiency of the windings in this manner is increased in the regions of the pole members so that less saturation current is necessary. The thin sectorial shaped members are of such shape that they are readily saturable and provide a deflection field well adapted to deflect the beam into only one target sector. In this manner less chance exists for error due to deflection of the beam across or near an unwanted target anode.

A set of deflection conditions corresponding to several different input polarities useful in a quadruple yoke are shown in Fig. 3. The sector B corresponds to the retained magnetic flux of the pole members. Deflection of the beam into the different quadrants in response to the retained flux of the pole members is indicated by the vector Z. Also the polarity of currents applied to the windings to effect such magnetic deflection polarities in a coil wound as indicated in Fig. 1 are designated by the "+" or "−" legends associated with leads $X_2$ and $Y_2$ for each of Figs. 3A through 3D.

Study of the several views under consideration will indicate that for a system containing four poles, $2n$ oppositely polarized salient poles are provided where $n$ is greater than 1, and any combination of $n$ adjacent poles are selectively excited in the same magnetic polarity to direct the beam into any of $n^2$ possible target zone sectors. Thus the writing or command process is accomplished by selective excitation of deflecting means for positioning the beam in a desired target zone.

It is to be recognized that more poles may be used if desired and the target arrangement may be suitably positioned to afford the storage of a larger number of digits in the memory device.

Figure 4:
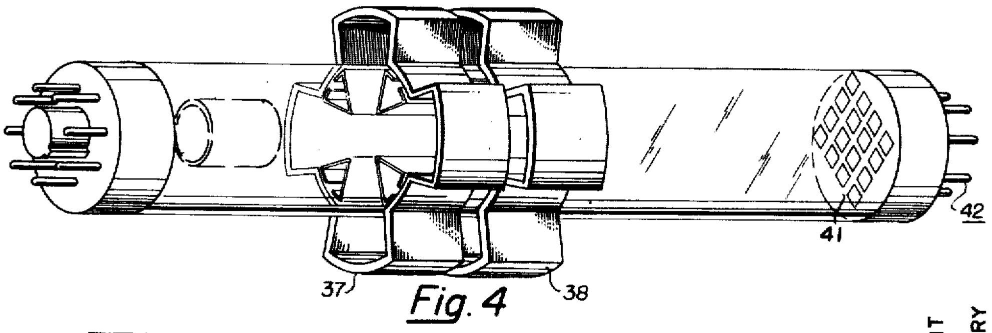
Fig. 4 is a perspective view of a cathode ray memory device constructed in accordance with a further embodiment of the invention.

One useful device for extending the number of digits memorized by the permanent magnetic cathode ray memory and coding tube of the invention is illustrated in Fig. 4. A cascaded series of multiple pole magnetic deflection yokes 37, 38 is arranged along the path of the tube. For two cascaded quadruple yokes shown, sixteen anode target members with external conductive connections 42 may be used in a quarternary system.

Figure 5:
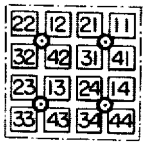
Fig. 5 is a plan view of a two dimensional target array for cathode ray devices of the invention, together with an associated binary to decimal code conversion chart.

Such a two dimensional target array is designated in minor and major quadrants by the respective two decimal digits in the respective anode target zones. To realize beam deflection for this array, one yoke must provide a major deflection capability of twice that of the minor deflection yoke. In the simplest case consider the first yoke 37 as providing the major deflection. A command signal to the yoke windings X, Y will provide deflection to the four major quadrants 1, 2, 3 and 4 in response to binary code signals 10, 11, 01 and 00 respectively as shown in the chart of Fig. 5. Assume, therefore, the beam is at one of the positions in response to the first two binary code digits. A like minor deflection by the yoke 38 will select the minor quadrant position so that one target zone is designated for each of the four digit binary numbers. If desired the zones may be labelled for conversion into corresponding decimal numbers or the zones may be connected electrically for conveying electrical pulses in response to beam impingement during the interrogation period.

Figure 6:
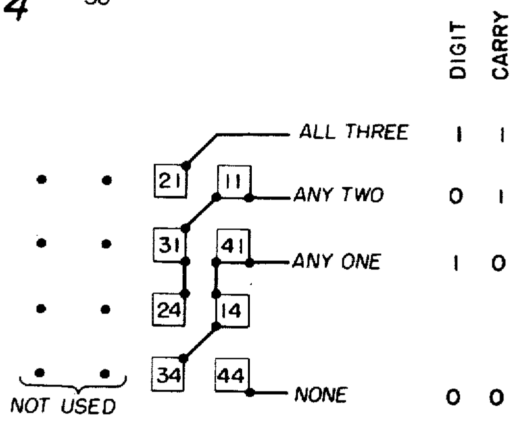
Fig. 6 is a plan view of another two dimensional target array and associated polarity chart arranged to illustrate binary addition in accordance with one embodiment of the invention.

The cathode ray memory device hereinbefore described has utility in computer circuits as a logical element. Consideration of a logic system for performing binary addition will illustrate the typical logical processes to which the device is adapted. As shown in Fig. 6, those common targets to which the beam is deflected in response to predetermined orders of deflecting conditions are conductively connected together.

For a better understanding of the logical process the binary addition process will be considered in detail, as follows:

Three digits must be added in each column to provide the complete addition of two numbers, the augend and the addend. The third digit is the carry in which is derived from the adjacent column as a carry out digit. The complete output information of the addition of a column comprises two digits representing the sum and the carry out. The tables which follow will illustrate the entire addition process along with the values of the sum and carry out signals in response to all possible combinations of the carry in, augend and addend signals.

| | | | | | | |
|---|---|---|---|---|---|---|
| 1 | 1 | 1 | 1 | 1 | | carry in |
| 0 | 1 | 0 | 1 | 1 | 1 | augend |
| 0 | 0 | 1 | 0 | 1 | 1 | addend |
| 1 | 0 | 0 | 0 | 1 | 0 | sum |
| 0 | 1 | 1 | 1 | 1 | 1 | carry out |

| carry in | augend | addend | sum | carry out |
|---|---|---|---|---|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

From a study of the sum and carry out signals derived from the various possible input signals, the following logic is evident:

Sum is "1" if and only if any one or all three inputs are "1."

Carry is "1" if and only if any two or all three inputs are "1."

The necessary information for obtaining binary addition is present therefore if signals are derived denoting that "none," "any one," "any two" and "all three" input signals are "1." A target array and conductive connecting circuit for obtaining this information with the tube of Fig. 4 is shown in Fig. 6. The accompanying chart denotes the deflection conditions for obtaining the necessary logic as derived from the more complete chart in Fig. 5. In binary addition with three input signals one deflection signal ($Y_2$ in the illustrated array) is left in the "0" state. Accordingly, only two rows of target anodes are used in the manner shown. Should other signals be left in the "0" state a different set of two rows would be used.

Figure 7:
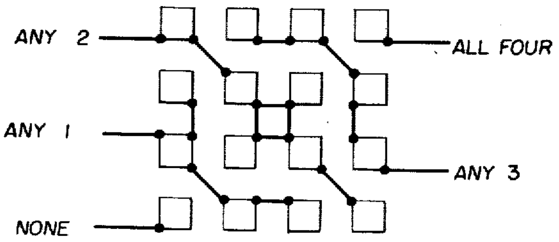
Fig. 7 is a plan view of a further target array suitable for electronic computer operations according to a suitable logic.

With the tube of Fig. 4, the entire target array may be utilized with a five condition logic and a four digit input signal with target connections as shown in Fig. 7. Other combinations of target arrays and deflection conditions may be used where convenient or necessary.

There has thus been afforded in accordance with the present invention improved computer elements and systems for providing different computer logic functions. A long memory cycle is afforded in accordance with the cathode ray tube device of the invention for a multiple digit input signal. Those novel features believed descriptive of the nature of the invention are defined with particularity in the following claims.

I claim:

1. In combination, a cathode ray tube, a magnetic deflection yoke having bi-stable magnetic deflection poles distributed about the path of the cathode ray beam to afford deflection of the beam into a two dimensional target zone and to store a memory of the last applied deflection, means coupled to said yoke for selectively magnetically exciting poles of said yoke in different magnetic polarities, and means generating a cathode ray beam when said means for magnetically exciting said poles are in a quiescent magnetic state.

2. Apparatus as defined in claim 1 wherein said poles comprise thin sectorial shaped salient magnetic members positioned inside the cathode ray tube envelope and the deflection yoke has excitation windings positioned outside said envelope.

3. Apparatus as defined in claim 1 wherein said poles have salient members constructed of magnetic material having high magnetic flux retentivity.

4. Apparatus as defined in claim 1 wherein said tube has a plurality of beam collecting target anodes positioned to intercept the cathode ray beam in corresponding target zones each defined by a different combination of magnetically saturated bi-stable poles.

5. Apparatus as defined in claim 4 wherein $2n$ salient poles are provided, $n$ being greater than 1, including means for permanently magnetizing any combination of $n$ adjacent poles in the same magnetic polarity whereby said beam may be directed selectively to said anodes by retained magnetism of said poles.

6. Apparatus as defined in claim 5 including means for generating said cathode ray beam only in accordance with a predetermined read out signal.

7. Apparatus as defined in claim 6 including a binary electronic circuit coupled to the means for selectively magnetizing said poles to saturation to store a memory of the last applied binary signals, whereby binary coded signals stored at the magnetizing means are converted to decimal coded signals at said anodes.

8. In combination, a cathode ray tube having a plurality of beam collecting anodes arranged in a two dimensional array, a bi-stable saturable magnetic storage and deflecting yoke having a plurality of poles radially surrounding the cathode ray beam path and adapted to store a memory of the last applied deflection magnetization and to selectively direct the beam to corresponding ones of said anodes, and means coupled to the yoke for selectively exciting different combinations of said poles to saturation in the same magnetic polarity thereby directing the beam to different ones of said anodes.

9. A magnetic memory and associated read out device comprising a cathode ray tube having a plurality of distinguishable target areas arranged in a two dimensional array, a saturable magnetic yoke having a plurality of beam deflecting means radially surrounding the cathode ray beam path and being respectively adapted to direct the beam to predetermined ones of said target areas, and means coupled to said yoke to selectively excite different combinations of said beam deflecting means to store thereon a memory of the last applied excitation and to thereby direct the beam to desired target areas.

10. A combination as defined in claim 9 including salient pole members of high magnetic retentivity magnetically coupled with each of said beam deflecting means, wherein said means for exciting the deflecting means provides a saturating magnetic flux for said poles to store therein a memory of the last applied excitation, and wherein means is included for generating a cathode ray beam only in response to a read out signal whereby the beam is deflected by the magnetic flux retained in said pole members after removal of exciting current to distinct target area positions thereby affording a memory device for reading information stored by the beam deflecting combination last exciting said poles to saturation.

11. The combination of a cathode ray tube having a plurality of target areas arranged in a two dimensional array, a multi element magnet storage beam deflection device having a plurality of beam positioning combinations radially surrounding the cathode ray beam path and corresponding to said target areas, means periodically energizing selected ones of said combinations, means for retaining magnetic flux generated by said periodic energization between the energization periods, and means generating a cathode ray beam only in response to a read out signal while in the magnetically retained condition.

12. A binary to decimal conversion system comprising in combination, a cathode ray tube, a multiple pole magnetic beam deflecting system for said tube, means producing saturated magnetic polarities of the poles in accordance with a binary code to store a memory of the last applied binary information, and a defined two dimensional target area arranged to intercept the cathode ray beam in a plurality of discrete deflected positions defined by the magnetic polarities of said poles and corresponding to the decimal equivalents of the binary code.

13. In combination, a code conversion system comprising, a cathode ray tube, deflection means having a plurality of $2n$ ordered poles for storing a memory of the last applied deflection energy and for deflecting the beam into a plurality of different target zones, where $n$ is greater than 1, means responsive to one code system connected for selectively saturating $n$ adjacent poles in the same magnetic polarity, and indicating means located in different target zones respectively positioned in beam impinging positions defined in response to different combinations of $n$ adjacently energized poles for providing signals indicative of a different code system.

14. A cathode ray tube having a plurality of high magnetic retentivity beam deflecting members adapted to deflect the beam into a plurality of target zones arranged in a two dimensional array by selective energization of the members with a saturating magnetic flux of a predetermined polarity and to store a memory of the last applied saturating magnetic flux, and a plurality of corresponding beam collecting targets arranged to indicate beam position in response to magnetic flux retained by different deflecting members.

15. In combination, a cathode ray tube, a magnetic deflection yoke having a plurality of pole pairs radially distributed about a fixed position along the path of the cathode ray beam, means coupled to the yoke for selectively exciting each of said pole pairs to establish a remanent magnetic flux in either of two magnetic polarities, and means for indicating by the position of the cathode ray beam different combinations of selected polarities.

16. Apparatus as defined in claim 15 wherein members of a magnetic material having high magnetic retentivity are magnetically coupled to said pole pairs and store a memory of the last applied remanent magnetic flux and are positioned adjacent the beam path whereby the beam may be positioned by retained magnetism of the poles.

17. In combination, a cathode ray tube, a magnetic deflection yoke having a plurality of pole pairs radially distributed about a fixed position along the path of the cathode ray beam, selection means coupled to said yoke for exciting desired pole pairs to saturation in either of two magnetic polarities to store a magnetic memory of the last applied excitation, and means coupled to said selection means for establishing excitation of the pole pairs only in a plurality of quiescent magnetic states.

18. In combination, a code conversion system comprising, a cathode ray tube, magnetic deflection means having a plurality of pole pairs radially distributed about a fixed position along the path of the cathode ray beam, means responsive to one code system connected for selectively and saturably energizing predetermined pairs of said poles in either of two polarities to store a magnetic memory of the last energization thereof, and indicating means located in different target zones for receiving the beam at positions defined in response to different combinations of pole saturation polarities for providing signals indicative of a different code system.

19. A code conversion system comprising, a cathode ray tube, bi-stable saturable magnetic storage means for selectively positioning the cathode ray beam in response to coded signals to fall in on a plurality of static zones arranged in a two dimensional array, target means for receiving the beam in said zones thereby decoding said signals in response to beam position, and members of a permanent magnet material for retaining the beam position after the coded signal period.

20. An electronic system comprising in combination, a beam generating device, means including a plurality of permanently polarizable beam deflecting members positioned about the beam, means connected for selectively polarizing said members in a plurality of static polarized conditions, a plurality of beam targets arranged in a two dimensional array to indicate the position of the beam and therefore the static condition of said members in response to impingement of the beam thereon, and further beam deflecting elements positioned adjacent to said members for retaining the polarization of said members in a selected condition.

21. In combination, a cathode ray tube, a cascaded series of multiple pole magnetic deflection means arranged along the beam path of said tube, bi-stable saturable magnet storage elements coupled with the poles of said deflection means for retaining a magnetic flux condition effective to deflect the cathode ray beam, means for periodically setting up different saturated flux conditions in said elements, and a two dimensional array of targets arranged to intercept the cathode ray beam deflected by said elements in a plurality of said conditions.

22. In combination as defined in claim 21 wherein said deflection means comprise two cascaded yokes, each having two pairs of poles, said array of targets comprises a quaternary system of sixteen targets each having an external electrically conductive connection, and wherein a source of deflection signals is provided for exciting said bi-stable saturable magnetic storage elements in each yoke in either one of two static magnetic flux conditions for directing the cathode ray beam to one of said sixteen targets.

23. A logical element for electronic computer systems comprising in combination, a cathode ray tube having a plurality of beam intercepting targets and a plurality of deflection means each operable in two alternative storage conditions providing a plurality of static conditions for directing the cathode ray beam to selected ones of said targets, and means associated with said targets indicating different ordered series of conditions of operation of said plurality of deflection means.

24. An element as defined in claim 23 wherein said deflection means comprise permanent magnetic storage members operable in two alternative saturated polarities.

25. A logical element adapted for binary addition comprising in combination, a cathode ray tube, a plurality of beam collecting anodes positioned in a plurality of zones, a plurality of magnetic deflecting windings, means for selectively exciting individual ones of said windings in either one of two polarities, permanent magnetic members magnetically coupled to each of said windings adapted for magnetic saturation in one of two polarities upon excitation of the associated winding in a corresponding polarity, thereby to store a memory of the last applied excitation and to deflect the beam by retained magnetic flux to intercept individual ones of said anodes for different combinations of polarities selected for said windings, and an electronic circuit conductively coupling different anodes in an ordered pattern such that commands directed to said deflection windings to select the polarity of excitation are translated to a prescribed logical form by said circuit.

References Cited in the file of this patent

UNITED STATES PATENTS

| | | |
|---|---|---|
| 2,137,888 | Fuller | Nov. 22, 1938 |
| 2,202,511 | Andrieu | May 28, 1940 |
| 2,239,407 | Wagner | Apr. 22, 1941 |
| 2,244,748 | Walker | June 10, 1941 |
| 2,454,410 | Snyder | Nov. 23, 1948 |
| 2,534,372 | Ring | Dec. 19, 1950 |
| 2,627,587 | Kohler | Feb. 3, 1953 |
| 2,677,779 | Goodrich | May 4, 1954 |

Disclaimer

2,802,138.—*Howard E. Tompkins*, Ridley Park, Pa. COMPUTING ELEMENTS AND SYSTEMS. Patent dated Aug. 6, 1957. Disclaimer filed July 20, 1959, by the assignee, *Burroughs Corporation*.

Hereby enters this disclaimer to claims 23, 24, and 25 of said patent.

[*Official Gazette September 1, 1959.*]